(12) United States Patent
Xiao et al.

(10) Patent No.: US 8,255,977 B2
(45) Date of Patent: Aug. 28, 2012

(54) TRUSTED NETWORK CONNECT METHOD BASED ON TRI-ELEMENT PEER AUTHENTICATION

(75) Inventors: Yuelei Xiao, Shaanxi (CN); Jun Cao, Shaanxi (CN); Xiaolong Lai, Shannxi (CN); Zhenhai Huang, Shaanxi (CN)

(73) Assignee: China IWNComm Co., Ltd., Shaannxi (CN)

( * ) Notice: Subject to any disclaimer, the term of this patent is extended or adjusted under 35 U.S.C. 154(b) by 372 days.

(21) Appl. No.: 12/626,546

(22) Filed: Nov. 25, 2009

(65) Prior Publication Data
US 2010/0077454 A1    Mar. 25, 2010

Related U.S. Application Data

(63) Continuation of application No. PCT/CN2008/071702, filed on Jul. 21, 2008.

(30) Foreign Application Priority Data

Aug. 1, 2007    (CN) .......................... 2007 1 0018395

(51) Int. Cl.
*G06F 21/00* (2006.01)
(52) U.S. Cl. .................. 726/3; 726/1; 726/25; 713/168; 713/169; 455/411; 380/259; 705/67
(58) Field of Classification Search .................. 713/168, 713/169; 726/3
See application file for complete search history.

(56) References Cited

U.S. PATENT DOCUMENTS
6,199,113 B1    3/2001 Alegre et al.
(Continued)

FOREIGN PATENT DOCUMENTS
CN    1976337 A    6/2007
(Continued)

OTHER PUBLICATIONS

"TCG Trusted Network Connect TNC Architecture for Interoperability" ./Specification Version 1.1, Revision 2, May 1, 2006, TCG Published, Internet Citation, http://www.opus1.com/nac/tnc/tnc_architecture_v1_1_r2.pdf.*

(Continued)

*Primary Examiner* — Taghi Arani
*Assistant Examiner* — Morshed Mehedi
(74) *Attorney, Agent, or Firm* — J.C. Patents

(57) ABSTRACT

A trusted network connect (TNC) method based on tri-element peer authentication is provided, which includes the following steps. Platform integrity information is prepared in advance. An integrity verification requirement is predefined. A network access requestor initiates an access request to a network access controller. The network access controller starts a mutual user authentication process, and performs a tri-element peer authentication protocol with a user authentication serving unit. After the mutual user authentication is successful, a TNC client, a TNC server, and a platform evaluation serving unit implement platform integrity evaluation by using a tri-element peer authentication method. The network access requestor and the network access controller control ports according to recommendations received respectively, so as to implement mutual access control between the access requestor and the access controller. Thus, the technical problems in the prior art of poor extensibility, complex key agreement process, low security, and that platform integrity evaluation is not peer-to-peer are solved by the present invention. Through the method of the present invention, key management and integrity verification mechanisms of the TNC are simplified, and the range of applicability of the TNC is expanded.

16 Claims, 2 Drawing Sheets

U.S. PATENT DOCUMENTS

| | | | |
|---|---|---|---|
| 7,793,103 B2* | 9/2010 | Fu et al. | 713/171 |
| 2002/0095586 A1* | 7/2002 | Doyle et al. | 713/186 |
| 2003/0200431 A1* | 10/2003 | Stirbu | 713/168 |
| 2005/0216736 A1* | 9/2005 | Smith | 713/168 |
| 2005/0223007 A1* | 10/2005 | Zimmer et al. | 707/9 |
| 2007/0300069 A1* | 12/2007 | Rozas | 713/176 |
| 2008/0072329 A1* | 3/2008 | Herschaft | 726/25 |
| 2008/0182592 A1* | 7/2008 | Cha et al. | 455/456.3 |
| 2008/0276301 A1* | 11/2008 | Nataraj et al. | 726/3 |

FOREIGN PATENT DOCUMENTS

| | | |
|---|---|---|
| CN | 1976338 | 6/2007 |
| CN | 101136928 A | 3/2008 |
| CN | 101159640 | 4/2008 |
| CN | 101159640 A | 4/2008 |
| CN | 101159660 | 4/2008 |
| EP | 1 182 557 | 2/2002 |

OTHER PUBLICATIONS

Carbone et al., "A formal model for trust in dynamic networks", Software Engineering and Formal Methods, 2003.Proceedings. First International Conference on, Sep. 22-27, 2003, pp. 54-61.*

"TCG Trusted Network Connect TNC Architecture for Interoperability" Specification Version 1.1, Revision 2, May 1, 2006, TCG Published, Internet Citation, https://www.trustedcomputinggroup.org/specs/TNC.

European Search Report of European Application No. 08 773 227.7 dated Nov. 4, 2011.

* cited by examiner

TRUSTED NETWORK CONNECT METHOD BASED ON TRI-ELEMENT PEER AUTHENTICATION

CROSS-REFERENCE TO RELATED APPLICATIONS

The application is a continuation of International Patent Application No. PCT/CN2008/071702, filed on Jul. 21, 2008, which claims priority to Chinese Patent Application No. 200710018395.8, filed on Aug. 1, 2007, and entitled "TRUSTED NETWORK CONNECT METHOD BASED ON TRI-ELEMENT PEER AUTHENTICATION". The contents of the above identified applications are hereby incorporated by reference in their entirety.

FIELD OF THE TECHNOLOGY

The present invention relates to the field of network security technologies, and more particular to a trusted network connect (TNC) method based on tri-element peer authentication.

BACKGROUND

With the development of informatization, the problem of malicious software such as viruses and worms gets worse. Currently, more than 35,000 forms of malicious software have emerged, and more than 40,000,000 computers are infected each year. In order to prevent these attacks, not only secure transmission and data input check need to be solved, but also the defense has to start from the source, that is, each terminal connected to the network. However, conventional security defense technologies can no longer defend against various malicious attacks.

Regarding the above problem, the international trusted computing group (TCG) specifically enacts a network connection criterion based on trusted computing technologies—trusted network connect (TNC), briefly referred to TCG-TNC, which includes an open terminal integrity architecture and a set of standards for ensuring secure interoperation. The set of standards may protect one network as required by a user to a user-defined level. Substantially, the TCG-TNC is to establish a connection based on integrity of the terminals. Firstly, a set of policies of internal system operational state in the trusted network are established. Only terminals complying with the enacted policies of network can access the network, and equipment not complying with the policies will be isolated and located by the network. Due to the use of a trusted platform module (TPM), attacks by root kits may be blocked. The root kits, which are adapted to illegally obtain the maximum control authority in a target system, are an attack script, a modified system program, or a whole set of attack scripts and tools.

One complete information transmission process for a trusted network connection in the TCG-TNC architecture is shown in FIG. 1. Before the network connection is established, a TNC client needs to prepare required platform integrity information and transmit the information to an integrity measurement collector (IMC). In a terminal provided with the TPM, platform information required by the network policy is hashed and then stored into respective platform configuration registers (PCRs), and a TNC server needs to predefine a platform integrity verification requirement and transmit the requirement to an integrity measurement verifier (IMV). The specific process is as follows.

(1) A network access requestor initiates an access request to a policy enforcer.

(2) The policy enforcer sends an access request description to a network access authority.

(3) After receiving the access request description of the network access requestor, the network access authority performs a user authentication protocol with the network access requestor. When the user authentication is successful, the network access authority sends the access request and information indicating that the user authentication is successful to the TNC server.

(4) After receiving the access request and the information indicating that the user authentication is successful sent by the network access authority, the TNC server performs mutual platform credential authentication with the TNC client, verifying, for example, an attestation identity key (AIK) of the platform.

(5) When the platform credential authentication is successful, the TNC client indicates to the integrity measurement collector that one new network connection is started and an integrity handshake protocol needs to be carried out. The integrity measurement collector returns required platform integrity information through an interface of integrity measurement collector (IF-IMC). The TNC server transmits the platform integrity information to the integrity measurement verifier through an interface of integrity measurement verifier (IF-IMV).

(6) During the process of the integrity handshake protocol, the TNC client and the TNC server need to exchange data one or more times until the TNC server is satisfied.

(7) When the TNC server has completed the integrity handshake protocol with the TNC client, the TNC server sends a recommendation to the network access authority to require granting access. A policy decision point may still do not grant access for the access requestor (AR) if other security policies need to be considered.

(8) The network access authority sends an access decision to the policy enforcer, and finally, the policy enforcer enforces the decision to control the access of the access requestor.

Currently, no mature TCG-TNC architecture product is available on the market. Some important technologies for the TCG-TNC architecture are still at the stage of research and specification development, and the TCG-TNC architecture mainly has the following disadvantages:

1. Poor extensibility. Since a predefined secure channel exists between a policy enforcement point and a policy decision point, and the policy decision point may manage a large number of policy enforcement points, which causes the policy decision point has to configure a large number of secure channels, and thus the management becomes complex, resulting in poor extensibility.

2. Complex key agreement process. Since security protection is required for data in the network access layer, a secure channel needs to be established between the access requestor and the policy decision point, that is, session key agreement needs to be implemented between the access requestor and the policy decision point. However, since data protection is also required between the access requestor and the policy enforcement point, session key agreement needs to be implemented again between the access requestor and the policy enforcement point, resulting in that the key agreement process is complex.

3. Low security. A master key that the access requestor and the policy decision point agree upon is transmitted to the policy enforcement point by the policy decision point. New points of attack are introduced because of the transmission of the key over the network, so that the security is degraded. In addition, as the same master key is used in the two session key agreement procedures, the security of the entire TNC architecture is also degraded.

4. The access requestor may fail to verify validity of the AIK certificate of the policy decision point. During the process of the platform credential authentication, the access requestor and the policy decision point performs mutual platform credential authentication by using AIK private keys and certificates, and both endpoints need to verify the validity of the AIK certificates. If the policy decision point is an Internet service provider of the access requestor, the access requestor cannot access the network and cannot verify the validity of the AIK certificate of the policy decision point, until a trusted network connection is established, which results in insecurity.

5. Platform integrity evaluation is not peer-to-peer. In the TCG-TNC architecture, the policy decision point performs platform integrity evaluation on the access requestor, but the access requestor does not perform platform integrity evaluation on the policy decision point. If the platform of the policy decision point is not trusted, connection of the access requestor to an untrusted device is not secure. However, peer-to-peer trust is critical in Ad hoc networks.

SUMMARY

The present invention is directed to a TNC method based on tri-element peer authentication, which can solve the problems in the prior art of poor extensibility, complex key agreement process, and low security, that the access requestor may fail to verify the validity of the AIK certificate, and that platform integrity evaluation is not peer-to-peer.

Technical solutions of the present invention are provided as follows.

A TNC method based on tri-element peer authentication is provided, which includes the following steps.

(1.) performing an initialization step:

(1.1) preparing, by a TNC client of an access requestor and a TNC server of an access controller (AC), platform integrity information in advance, and transmitting the platform integrity information to integrity measurement collectors in their respective integrity measurement layers;

(1.2) predefining, by the TNC client and the TNC server, an integrity verification requirement, wherein the integrity verification requirement comprises platform configuration registers (PCRs) lists that the access requestor and the access controller request each other to verify; and (1.3) hashing, by trusted platform modules (TPMs) of the access requestor and the access controller, information required by a network policy, and then storing the hashed information into the PCRs;

(2.) performing a user authentication step:

(2.1) initiating, by a network access requestor, an access request to a network access controller;

(2.2) starting, by the network access controller, a mutual user authentication process after receiving the access request, and starting, by the network access requestor, the network access controller, and a user authentication serving unit in a network access layer, to perform a tri-element peer authentication protocol, so as to implement mutual user authentication and key agreement between the access requestor and the access controller; and (2.3) when the mutual user authentication is successful, respectively transmitting, by the network access requestor and the network access controller, information indicating that the user authentication is successful to the TNC client and the TNC server, and controlling ports of the network access requestor and the network access controller according to a result of the user authentication;

(3.) performing an integrity evaluation step:

when the TNC server of the access controller receives the information indicating that the user authentication is successful sent from the network access controller, implementing, by the TNC client, the TNC server, and a platform evaluation serving unit in an integrity evaluation layer, platform integrity evaluation of the access requestor and the access controller by using a tri-element peer authentication method; and (4.) performing an access control step:

respectively summarizing, by the TNC server and the TNC client, platform integrity evaluation results of the access controller and the access requestor, and respectively sending a recommendation to the network access requestor and the network access controller; and respectively controlling, by the network access requestor and the network access controller, ports according to the respective received recommendations, so as to implement mutual access control between the access requestor and the access controller.

Preferably, the platform integrity evaluation may be implemented by using the following methods.

①. Platform credential authentication: a policy manager verifies the validity of AIK certificates of the access requestor and the access controller.

②. Platform integrity verification: the policy manager verifies platform integrity of the access requestor and the access controller.

Preferably, the implementing, by the TNC client, the TNC server, and the platform evaluation serving unit in the integrity evaluation layer, the platform integrity evaluation of the access requestor and the access controller by using the tri-element peer authentication method includes the following steps.

(3.1) when the TNC server of the access controller receives the information indicating that the user authentication is successful sent from the network access controller or has acknowledged that the user authentication is successful, sending, by the TNC server of the access controller, a random number $N_S$ generated by the TPM of the access controller, an AIK certificate $Cert_{AC-AIK}$ of the access controller, and a PCRs list $PCRsList_{AR}$ requested by the access controller from the access requestor to the access requestor;

(3.2) after receiving the information sent from the access controller in Step (3.1), firstly, extracting, by the access requestor, a corresponding PCRs value from the TPM according to the PCRs list requested by the access controller; then, generating, by the access requestor, a signature in the TPM by using an AIK private key for the corresponding PCRs value extracted from the TPM and the random number $N_S$ generated by the TPM of the access controller; and finally, sending, by the access requestor, the random number $N_S$ generated by the TPM of the access controller, a random number $N_{AR}$ generated by the TPM of the access requestor, an AIK certificate $Cert_{AR-AIK}$ of the access requestor, a PCRs list $PCRsList_{AC}$ requested by the access requestor from the access controller, a PCRs value $PCRs_{AR}$ requested by the access controller, a measurement log $Log_{AR}$ corresponding to the PCRs value requested by the access controller, and the signature generated by the access requestor in the TPM by using the AIK private key for the corresponding PCRs value extracted from the TPM and the random number $N_S$ generated by the TPM of the access controller to the access controller;

(3.3) after receiving the information sent from the access requestor in Step (3.2), firstly, enabling, by the access controller, the TPM to verify consistency of the random number $N_S$ generated by the TPM of the access controller and use a public key in the AIK certificate of the access requestor to verify the validity of the AIK signature of the access requestor; then, extracting, by the access controller, a corresponding PCRs value from the TPM according to the PCRs list requested by the access requestor; afterward, generating, by the access controller, a signature in the TPM by using an AIK private key for the corresponding PCRs value extracted from the TPM and the random number $N_{AR}$ generated by the TPM of the access requestor; and finally, sending, by the access controller, the random number $N_S$ generated by the TPM of the access controller, the random number $N_{AR}$ generated by the TPM of the access requestor, the AIK certificate $Cert_{AR\text{-}AIK}$ of the access requestor, the PCRs value $PCRs_{AR}$ requested by the access controller, the measurement log $Log_{AR}$ corresponding to the PCRs value requested by the access controller, the signature generated by the access requestor in the TPM by using the AIK private key for the corresponding PCRs value extracted from the TPM and the random number $N_S$ generated by the TPM of the access controller, a random number $N_{AC}$ generated by an access controller user, the AIK certificate $Cert_{AC\text{-}AIK}$ of the access controller, a PCRs value $PCRs_{AC}$ requested by the access requestor, a measurement log $Log_{AC}$ corresponding to the PCRs value requested by the access requestor, and the signature generated by the access controller in the TPM by using the AIK private key for the corresponding PCRs value extracted from the TPM and the random number $N_{AR}$ generated by the TPM of the access requestor to the policy manager;

(3.4) after receiving the information sent from the access controller in Step (3.3), firstly, using, by the policy manager, public keys corresponding to the respective AIK certificates of the access requestor and the access controller to verify the validity of the AIK signatures and the AIK certificates of the access requestor and the access controller; then, recalculating, by the policy manager, corresponding PCRs values according to the measurement logs of the corresponding PCRs values extracted from the respective TPMs of the access requestor and the access controller and according to standard integrity measurement value of various platform components in a database, and comparing the recalculated corresponding PCRs values with the corresponding PCRs values in the information sent from the access controller in Step (3.3); afterward, creating, by the policy manager, an AIK certificate authentication and platform integrity verification result $Result_{AIK\text{-}PCRs}$ of the access requestor and the access controller, and using a private key corresponding to an identity certificate of the policy manager to generate a signature $[Result_{AIK\text{-}PCRs}]_{Sig}$ for the created AIK certificate authentication and platform integrity verification result; and finally, sending, by the policy manager, the AIK certificate authentication and platform integrity verification result $Result_{AIK\text{-}PCRs}$ of the access requestor and the access controller as well as the signature $[Result_{AIK\text{-}PCRs}]_{Sig}$ generated by the policy manager for the AIK certificate authentication and platform integrity verification result to the access controller;

(3.5) after receiving the information sent from the policy manager in Step (3.4), firstly, verifying, by the access controller, whether a random number $N_{AC}$ generated by the access controller user is consistent with the random number $N_{AC}$ generated by the access controller user in the information sent from the policy manager in Step (3.4), and verifying the validity of the user signature of the policy manager; then, enabling, by the access controller, the TPM to verify consistency of the random number $N_S$ generated by the TPM of the access controller, and verify consistency between the AIK certificate $Cert_{AR\text{-}AIK}$ of the access requestor and the PCRs value $PCRs_{AR}$ requested by the access controller; afterward, verifying, by the access controller, an AIK certificate verification result $Re_{AR\text{-}AIK}$ of the access requestor and a platform integrity verification result $Re_{AR}$ of the access requestor, and creating a platform integrity evaluation result of the access requestor; and finally, sending, by the access controller, the information in Step (3.4) and the signature generated by the access controller in the TPM by using the AIK private key for the corresponding PCRs value extracted from the TPM and the random number $N_{AR}$ generated by the TPM of the access requestor to the access requestor; and (3.6) after receiving the information sent from the access controller in Step (3.5), firstly, verifying, by the access requestor, the validity of the AIK signature of the access controller and the user signature of the policy manager; then, enabling, by the access requestor, the TPM to verify consistency of the random number $N_{AR}$ generated by the TPM of the access requestor; afterward, verifying, by the access requestor, consistency between the AIK certificate of the access controller and the PCRs value requested by the access requestor; and finally, verifying, by the access requestor, an AIK certificate verification result $Re_{AC\text{-}AIK}$ of the access controller and a platform integrity verification result $Re_{AC}$ of the access controller, and creating a platform integrity evaluation result of the access requestor.

Preferably, the AIK certificate authentication and platform integrity verification result $Result_{AIK\text{-}PCRs}$ of the access requestor and the access controller created in Step (3.4) includes the random number $N_{AC}$ generated by the access controller user, the random number $N_S$ generated by the TPM of the access controller, the AIK certificate $Cert_{AR\text{-}AIK}$ of the access requestor, the PCRs value $PCRs_{AR}$ requested by the access controller, the platform integrity verification result $Re_{AR}$ of the access requestor, the random number $N_{AR}$ generated by the TPM of the access requestor, the AIK certificate $Cert_{AC\text{-}AIK}$ of the access controller, the PCRs value $PCRs_{AC}$ requested by the access requestor, the platform integrity verification result $Re_{AC}$ of the access controller, the AIK certificate verification result $Re_{AR\text{-}AIK}$ of the access requestor, and the AIK certificate verification result $Re_{AC\text{-}AIK}$ of the access controller.

Preferably, the recommendations sent from the TNC server and the TNC client to the network access controller and the network access requestor in Step (4.) may be access grant information, access denial information, or isolation remediation information and so on.

Preferably, in the process of creating the platform integrity evaluation result of the access requestor in Step (3.5), when the access controller needs to exchange integrity information with the access requestor and verify the integrity information again, Step (3.1) to Step (3.6) may be repeated.

Preferably, in the process of creating the platform integrity evaluation result of the access requestor in Step (3.6), when the access requestor needs to exchange integrity information with the access controller and verify the integrity information again, Step (3.2) to Step (3.6) are repeated.

It can be seen from the above technical solutions of the present invention that, key agreement is performed between the access requestor and the access controller, such that data in the platform integrity evaluation process and service data after the trusted network connection are directly protected without performing session key agreement again, thereby simplifying the key agreement process and improving the security of the trusted network connection. The master key generated in the authentication process does not need to be transmitted in the network, so that the security of the key is ensured.

In addition, in the present invention, a tri-element peer authentication method, that is, a third party-based mutual authentication method, is adopted in the integrity evaluation layer to respectively authenticate and verify the AIK certificates and platform integrity of the access requestor and the access controller in a centralized manner, so that not only the security in the platform integrity evaluation process is enhanced, but also the key management and integrity verification mechanisms of the trusted network connect architecture are also simplified.

Moreover, in the present invention, the tri-element peer authentication method is not only adopted to implement mutual user authentication in the network access layer, but also adopted to implement mutual platform integrity evaluation in the integrity evaluation layer, so that the security of the entire TNC architecture is improved.

In practical applications, a policy manager needs to manage a large number of access controllers. Through the present invention, the requirements for strong security association between the access controllers and the policy manager can be eliminated, thereby improving the extensibility of the trusted network connection.

Figure 1:
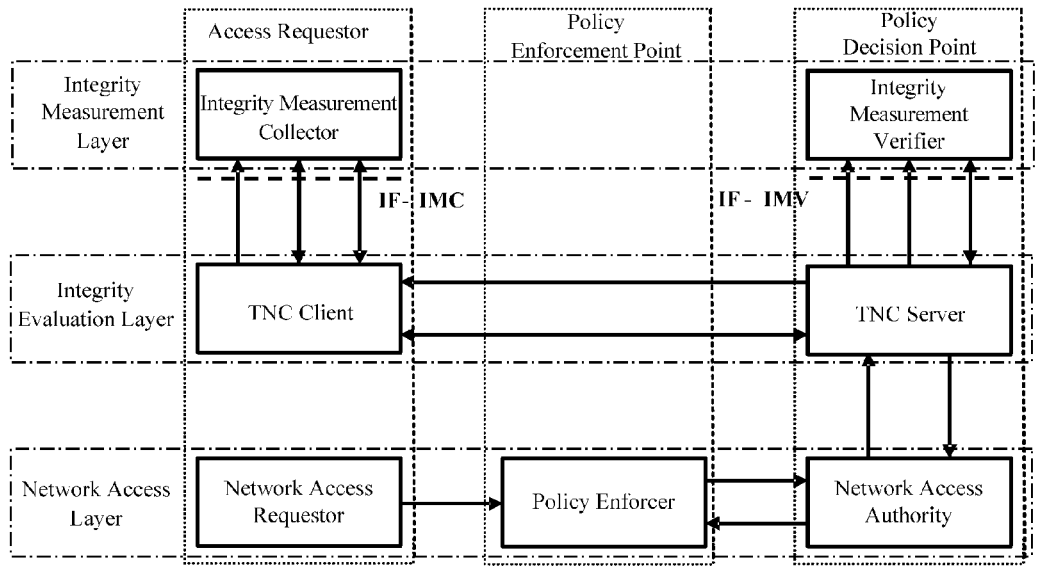
FIG. 1 is a schematic view of one complete information transmission process for a trusted network connection in a TCG-TNC architecture in the prior art.

$N_S$: random number generated by the TPM of the access controller (AC);

$Cert_{AC\text{-}AIK}$: AIK certificate of the access controller;

$PCRsList_{AR}$: PCRs list requested by the access controller from the access requestor;

$N_{AR}$: random number generated by the TPM of the access requestor;

$Cert_{AR\text{-}AIK}$: AIK certificate of the access requestor;

$PCRsList_{AC}$: PCRs list requested by the access requestor from the access controller;

$Log_{AR}$: measurement log corresponding to the PCRs value requested by the access controller;

$PCRs_{AR}$: PCRs value requested by the access controller;

$[N_S, PCRs_{AR}]_{Sig}$: signature generated by the access requestor for the random number $N_S$ generated by the TPM of the access controller and the corresponding PCRs value requested by the access controller;

$N_{AC}$: random number generated by a access controller user;

$Log_{AC}$: measurement log corresponding to the PCRs value requested by the access requestor;

$PCRs_{AC}$: PCRs value requested by the access requestor;

$[N_{AR}, PCRs_{AC}]_{Sig}$: signature generated by the access controller for the random number $N_{AR}$ generated by the TPM of the access requestor and the corresponding PCRs value requested by the access requestor;

$Result_{AIK\text{-}PCRs}$: AIK certificate authentication and integrity verification result of the access requestor and the access controller;

$[Result_{AIK\text{-}PCRs}]_{Sig}$: signature generated by the policy manager for the AIK certificate authentication and integrity verification result of the access requestor and the access controller;

$Re_{AC}$: platform integrity verification result of the access controller;

$Re_{AR}$: platform integrity verification result of the access requestor;

$Re_{AR\text{-}AIK}$: AIK certificate verification result of the access requestor;

$Re_{AC\text{-}AIK}$: AIK certificate verification result of the access controller.

DETAILED DESCRIPTION

The present invention is mainly constituted by a network access layer, an integrity evaluation layer, and an integrity measurement layer. An access requestor, an access controller, and a policy manager are three logical entities of the present invention, and may be distributed at any position in a network. The access requestor is also referred to as a requestor, a subscriber station, or the like; the access controller is also referred to as an authentication access controller, a base station, an access server unit, or the like; and the policy manager is also referred to as an authentication server, a trusted server, a background server, or the like.

The network access layer is responsible for implementing mutual user authentication and key agreement between the access requestor and the access controller, and for implementing mutual access control between the access requestor and the access controller according to a network user authentication result and a platform integrity evaluation result. The network access layer may adopt an access control method based on tri-element peer authentication, which is a network access control technology used in China WLAN standards.

The integrity evaluation layer is responsible for implementing platform integrity evaluation between the access requestor and the access controller, including platform credential authentication and platform integrity verification. In the integrity evaluation layer, the access requestor, the access controller, and the policy manager perform tri-element peer authentication, that is, third party-based mutual authentication, and the policy manager is responsible for verifying the validity of the AIK certificates of the access requestor and the access controller and for verifying the platform integrity of the access requestor and the access controller.

The integrity measurement layer is responsible for collecting and verifying platform integrity-related information of the access requestor and the access controller.

Figure 2:
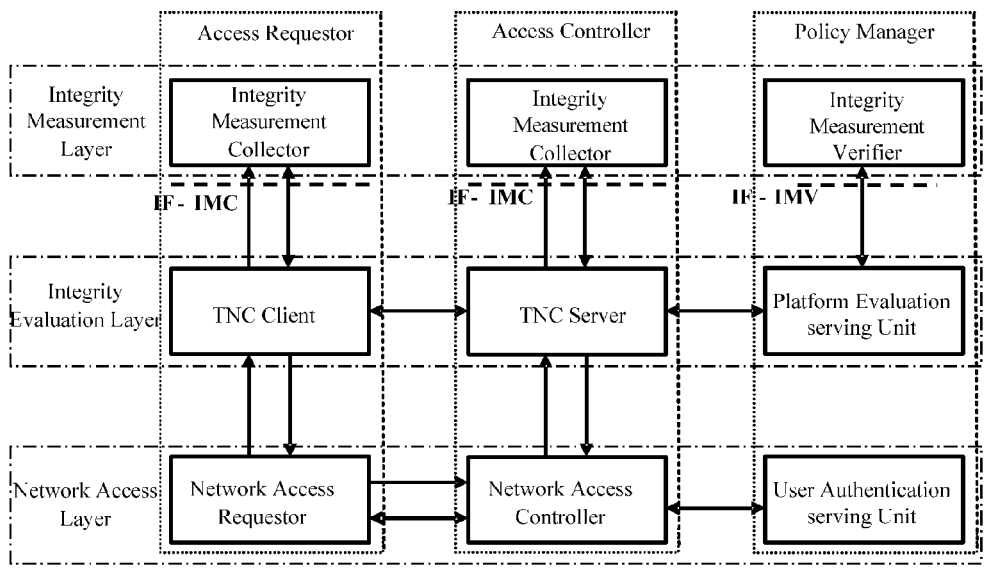
FIG. 2 is a schematic view of one complete information transmission process for a trusted network connection in a TNC architecture according to the present invention.

FIG. 2 is a schematic view of one complete information transmission process for a trusted network connection according to the present invention. The present invention is implemented through the following steps.

(1.) Initialization is performed. Before a network connection is established, the following steps are performed.

(1.1) A TNC client of an access requestor and a TNC server of an access controller both need to prepare platform integrity information in advance, and transmit the platform integrity information to integrity measurement collectors of their respective integrity measurement layers.

(1.2) The TNC client and the TNC server both need to predefine an integrity verification requirement, and the integrity verification requirement includes PCRs lists that the access requestor and the access controller request each other to verify.

(1.3) TPMs of the access requestor and the access controller hash information required by a network policy and then store the hashed information into the PCRs.

(2.) User authentication is performed.

(2.1) A network access requestor initiates an access request to a network access controller.

(2.2) After receiving the access request from, the network access controller starts a mutual user authentication process, and the network access requestor, the network access controller, and a user authentication serving unit in a network access layer start to perform a tri-element peer authentication protocol, that is, a third party-based mutual authentication protocol, so as to implement mutual user authentication and key agreement between the access requestor and the access controller.

(2.3) When the mutual user authentication is successful, the network access requestor and the network access controller respectively transmit information indicating that the user authentication is successful to the TNC client and the TNC server, and control ports of the network access requestor and the network access controller according to a result of the user authentication, such that data in the integrity evaluation process can pass through the ports.

(3.) Integrity evaluation is performed.

When the TNC server of the access controller receives the information indicating that the user authentication is successful sent from the network access controller, the TNC client, the TNC server, and a platform evaluation serving unit in an integrity evaluation layer implement platform integrity evaluation of the access requestor and the access controller by using a tri-element peer authentication method. In the platform integrity evaluation process, the TNC server, the TNC client, and the platform evaluation serving unit also need to exchange information with the integrity measurement collector and an integrity measurement verifier in the upper layer. The platform integrity evaluation may be implemented by the following methods.

①. Platform credential authentication: a policy manager verifies the validity of AIK certificates of the access requestor and the access controller.

②. Platform integrity verification: the policy manager verifies platform integrity of the access requestor and the access controller.

Figure 3:
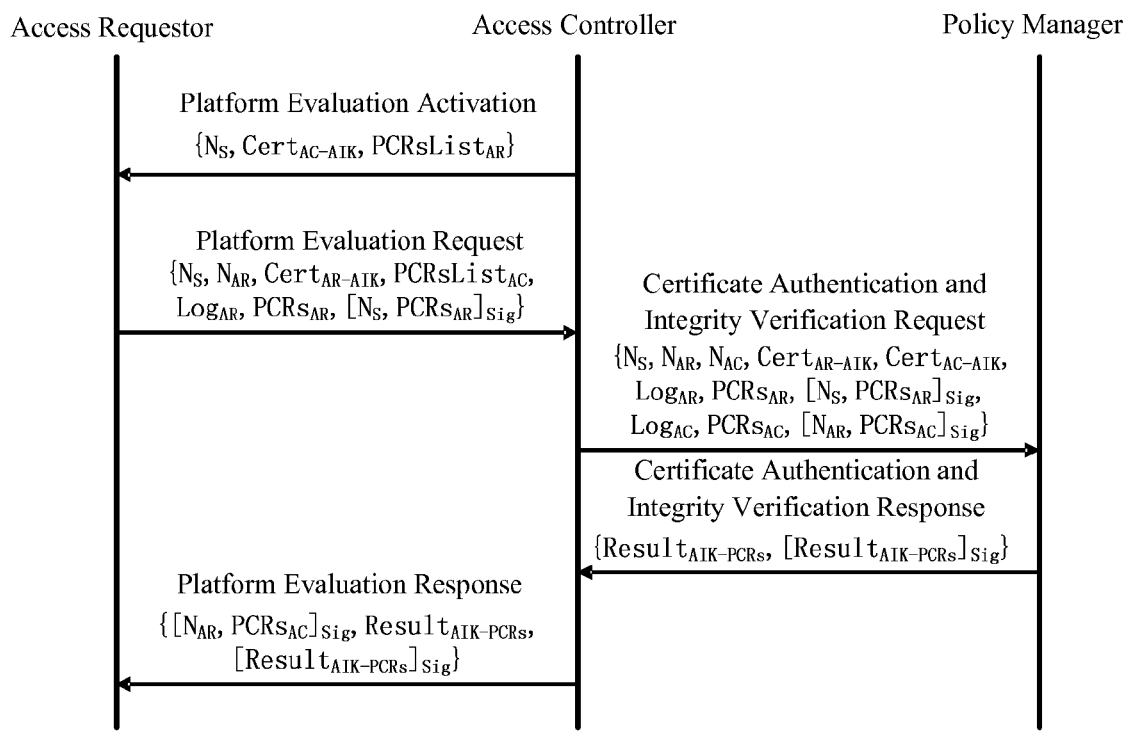
FIG. 3 is a schematic view of a platform integrity evaluation process of the TNC architecture according to the present invention.

Referring to FIG. 3, the platform integrity evaluation of the present invention is specifically implemented as follows.

(3.1) When the TNC server of the access controller receives the information indicating that the user authentication is successful sent from the network access controller or has acknowledged that the user authentication is successful, the TNC server of the access controller sends a random number $N_S$ generated by the TPM of the access controller, an AIK certificate $Cert_{AC-AIK}$ of the access controller, and a PCRs list $PCRsList_{AR}$ requested by the access controller from the access requestor to the access requestor.

(3.2) After receiving the information sent from the access controller in Step (3.1), firstly, the access requestor extracts a corresponding PCRs value from the TPM according to the PCRs list requested by the access controller. Then, the access requestor generates a signature in the TPM by using an AIK private key for the corresponding PCRs value extracted from the TPM and the random number $N_S$ generated by the TPM of the access controller. Finally, the access requestor sends the random number $N_S$ generated by the TPM of the access controller, a random number $N_{AR}$ generated by the TPM of the access requestor, an AIK certificate $Cert_{AR-AIK}$ of the access requestor, a PCRs list $PCRsList_{AC}$ requested by the access requestor from the access controller, a PCRs value $PCRs_{AR}$ requested by the access controller, a measurement log $Log_{AR}$ corresponding to the PCRs value requested by the access controller, and the signature generated by the access requestor in the TPM by using the AIK private key for the corresponding PCRs value extracted from the TPM and the random number $N_S$ generated by the TPM of the access controller to the access controller.

(3.3) After receiving the information sent from the access requestor in Step (3.2), firstly, the access controller enables the TPM to verify consistency of the random number $N_S$ generated by the TPM of the access controller and use a public key in the AIK certificate of the access requestor to verify the validity of the AIK signature of the access requestor; and then, the access controller extracts a corresponding PCRs value from the TPM according to the PCRs list requested by the access requestor. Afterward, the access controller generates a signature in the TPM by using an AIK private key for the corresponding PCRs value extracted from the TPM and the random number $N_{AR}$ generated by the TPM of the access requestor. Finally, the access controller sends the random number $N_S$ generated by the TPM of the access controller, the random number $N_{AR}$ generated by the TPM of the access requestor, the AIK certificate $Cert_{AR-AIK}$ of the access requestor, the PCRs value $PCRs_{AR}$ requested by the access controller, the measurement log $Log_{AR}$ corresponding to the PCRs value requested by the access controller, the signature generated by the access requestor in the TPM by using the AIK private key for the corresponding PCRs value extracted from the TPM and the random number $N_S$ generated by the TPM of the access controller, a random number $N_{AC}$ generated by an access controller user, the AIK certificate $Cert_{AC-AIK}$ of the access controller, a PCRs value $PCRs_{AC}$ requested by the access requestor, a measurement log $Log_{AC}$ corresponding to the PCRs value requested by the access requestor, and the signature generated by the access controller in the TPM by using the AIK private key for the corresponding PCRs value extracted from the TPM and the random number $N_{AR}$ generated by the TPM of the access requestor to the policy manager.

(3.4) After receiving the information sent from the access controller in Step (3.3), firstly, the policy manager uses public keys corresponding to the respective AIK certificates of the access requestor and the access controller to verify the validity of the AIK signatures and the AIK certificates of the access requestor and the access controller. Then, the policy manager recalculates corresponding PCRs values according to the measurement logs of the corresponding PCRs values extracted from the respective TPMs of the access requestor and the access controller and according to standard integrity measurement value of various platform components in a database, and compares the recalculated corresponding PCRs values with the corresponding PCRs values in the information sent from the access controller in Step (3.3). Afterward, the policy manager creates an AIK certificate authentication and platform integrity verification result $Result_{AIK-PCRs}$ of the access requestor and the access controller, and uses a private key corresponding to an identity certificate of the policy manager to generate a signature $[Result_{AIK-PCRs}]_{Sig}$ for the created AIK certificate authentication and platform integrity verification result. Finally, the policy manager sends the AIK certificate authentication and platform integrity verification result $Result_{AIK-PCRs}$ of the access requestor and the access controller as well as the signature $[Result_{AIK-PCRs}]_{Sig}$ generated by the policy manager for the AIK certificate authentication and platform integrity verification result to the access controller.

Here, the AIK certificate authentication and platform integrity verification result $Result_{AIK-PCRs}$ of the access requestor and the access controller created in Step (3.4) includes: the random number $N_{AC}$ generated by the access controller user, the random number $N_S$ generated by the TPM of the access controller, the AIK certificate $Cert_{AR-AIK}$ of the access requestor, the PCRs value $PCRs_{AR}$ requested by the access controller, the platform integrity verification result $Re_{AR}$ of the access requestor, the random number $N_{AR}$ generated by the TPM of the access requestor, the AIK certificate $Cert_{AC-AIK}$ of the access controller, the PCRs value $PCRs_{AC}$ requested by the access requestor, the platform integrity verification result $Re_{AC}$ of the access controller, the AIK certificate verification result $Re_{AR-AIK}$ of the access requestor, and the AIK certificate verification result $Re_{AC-AIK}$ of the access controller.

(3.5) After receiving the information sent from the policy manager in Step (3.4), firstly, the access controller verifies whether a random number $N_{AC}$ generated by the access controller user is consistent with the random number $N_{AC}$ generated by the access controller user in the information sent from the policy manager in Step (3.4), and verifying the validity of the user signature of the policy manager. Then, the access controller enables the TPM to verify consistency of the random number $N_S$ generated by the TPM of the access controller, and verify consistency between the AIK certificate $Cert_{AR-AIK}$ of the access requestor and the PCRs value $PCRs_{AR}$ requested by the access controller. Afterward, the access controller verifies an AIK certificate verification result $Re_{AR-AIK}$ of the access requestor and a platform integrity verification result $Re_{AR}$ of the access requestor, and creates a platform integrity evaluation result of the access requestor. Finally, the access controller sends the information in Step (3.4) and the signature generated by the access controller in the TPM by using the AIK private key for the corresponding PCRs value extracted from the TPM and the random number $N_{AR}$ generated by the TPM of the access requestor to the access requestor.

Here, in the process of creating the platform integrity evaluation result of the access requestor in Step (3.5), if the access controller is not satisfied with the result or to meet requirements of other network policies, the access controller needs to exchange integrity information with the access requestor and verify the integrity information again, and Step (3.1) to Step (3.6) are repeated. The process of verifying the validity of the AIK certificate and additional platform integrity verification performed by the access requestor on the access controller are optional as required.

(3.6) After receiving the information sent from the access controller in Step (3.5), firstly, the access requestor verifies the validity of the AIK signature of the access controller and the user signature of the policy manager. Then, the access requestor enables the TPM to verify consistency of the random number $N_{AR}$ generated by the TPM of the access requestor. Afterward, the access requestor verifies consistency between the AIK certificate of the access controller and the PCRs value requested by the access requestor. Finally, the access requestor verifies an AIK certificate verification result $Re_{AC-AIK}$ of the access controller and a platform integrity verification result $Re_{AC}$ of the access controller, and creates a platform integrity evaluation result of the access requestor.

Here, in the process of creating the platform integrity evaluation result of the access requestor in Step (3.6), if the access requestor is not satisfied with the result or to meet requirements of other network policies, the access requestor needs to exchange integrity information with the access controller and verify the integrity information again, and Step (3.2) to Step (3.6) are repeated. The process of verifying the validity of the AIK certificate and additional platform integrity verification performed by the access controller on the access requestor are optional as required.

(4.) Access control is performed.

The TNC server and the TNC client respectively summarize platform integrity evaluation results of the access controller and the access requestor, and then respectively send a recommendation to the network access requestor and the network access controller. The recommendations sent from the TNC server and the TNC client to the network access controller and the network access requestor may be access grant information, access denial information, or isolation remediation information and so on. The network access requestor and the network access controller respectively control ports according to the respective received recommendations, so as to implement mutual access control between the access requestor and the access controller.

In the embodiments of the present invention, key agreement is performed between the access requestor and the access controller, such that data in the platform integrity evaluation process and service data after the trusted network connection are directly protected without performing session key agreement again, thereby simplifying the key agreement process and improving the security of the trusted network connection. The master key generated in the authentication process does not need to be transmitted in the network, so that the security of the key is ensured.

In addition, in the present invention, a tri-element peer authentication method, that is, a third party-based mutual authentication method, is adopted in the integrity evaluation layer to respectively authenticate and verify the AIK certificates and platform integrity of the access requestor and the access controller in a centralized manner, so that not only the security in the platform integrity evaluation process is enhanced, but also the key management and integrity verification mechanisms of the trusted network connect architecture are also simplified.

Moreover, in the present invention, the tri-element peer authentication method is not only adopted to implement mutual user authentication in the network access layer, but also adopted to implement mutual platform integrity evaluation in the integrity evaluation layer, so that the security of the entire TNC architecture is improved.

Furthermore, in practical applications, a policy manager needs to manage a large number of access controllers. Through the embodiments of the present invention, the requirements for strong security association between the access controllers and the policy manager can be eliminated, thereby improving the extensibility of the trusted network connection.

The TNC method based on tri-element peer authentication provided in the present invention is described in detail above. The principle and implementation of the present invention are described herein through specific examples. The description about the embodiments of the present invention is merely provided for ease of understanding of the solutions of the present invention. Persons of ordinary skill in the art can make variations and modifications to the present invention in terms of the specific implementations and application scopes according to the ideas of the present invention. Therefore, the specification shall not be construed as limitations to the present invention.

What is claimed is:

1. A trusted network connect (TNC) method based on tri-element peer authentication, comprising:
   (1.) performing an initialization step:
   (1.1) preparing, by a TNC client of an access requestor and a TNC server of an access controller, platform integrity information in advance, and transmitting the platform integrity information to integrity measurement collectors (IMC) in their respective integrity measurement layers;

(1.2) predefining, by the TNC client and the TNC server, an integrity verification requirement, wherein the integrity verification requirement comprises platform configuration registers (PCRs) lists that the access requestor and the access controller request each other to verify; and
(1.3) hashing, by trusted platform modules (TPMs) of the access requestor and the access controller, information required by a network policy, and then storing the hashed information into the PCRs lists;
(2.) performing a user authentication step:
(2.1) initiating, by a network access requestor, an access request to a network access controller;
(2.2) starting, by the network access controller, a mutual user authentication process after receiving the access request, and starting, by the network access requestor, the network access controller, and a user authentication serving unit in a network access layer, to perform a tri-element peer authentication protocol, so as to implement mutual user authentication and key agreement between the access requestor and the access controller; and
(2.3) when the mutual user authentication is successful, respectively transmitting, by the network access requestor and the network access controller, information indicating that the user authentication is successful to the TNC client and the TNC server, and controlling ports of the network access requestor and the network access controller according to a result of the user authentication;
(3.) performing an integrity evaluation step:
when the TNC server of the access controller receives the information indicating that the user authentication is successful sent from the network access controller, implementing, by the TNC client, the TNC server, and a platform evaluation serving unit in an integrity evaluation layer, platform integrity evaluation of the access requestor and the access controller by using a tri-element peer authentication method; and
(4.) performing an access control step:
respectively summarizing, by the TNC server and the TNC client, platform integrity evaluation results of the access controller and the access requestor, and respectively sending a recommendation to the network access requestor and the network access controller; and
respectively controlling, by the network access requestor and the network access controller, ports according to the respective received recommendations, so as to implement mutual access control between the access requestor and the access controller.

2. The TNC method according to claim 1, wherein the implementing the platform integrity evaluation comprises: verifying, by a policy manager, validity of attestation identity key (AIK) certificates and platform integrity of the access requestor and the access controller.

3. The TNC method according to claim 1, wherein the implementing, by the TNC client, the TNC server, and the platform evaluation serving unit in the integrity evaluation layer, the platform integrity evaluation of the access requestor and the access controller by using the tri-element peer authentication method comprises:
(3.1) when the TNC server of the access controller receives the information indicating that the user authentication is successful sent from the network access controller or has acknowledged that the user authentication is successful, sending, by the TNC server of the access controller, a random number $N_S$ generated by the TPM of the access controller, an AIK certificate $Cert_{AC\text{-}AIK}$ of the access controller, and a PCRs list $PCRsList_{AR}$ requested by the access controller from the access requestor to the access requestor;
(3.2) after receiving the information sent from the access controller in Step (3.1), firstly, extracting, by the access requestor, a corresponding PCRs value from the TPM according to the PCRs list requested by the access controller; then, generating, by the access requestor, a signature in the TPM by using an AIK private key for the corresponding PCRs value extracted from the TPM and the random number $N_S$ generated by the TPM of the access controller; and finally, sending, by the access requestor, the random number $N_S$ generated by the TPM of the access controller, a random number $N_{AR}$ generated by the TPM of the access requestor, an AIK certificate $Cert_{AR\text{-}AIK}$ of the access requestor, a PCRs list $PCRsList_{AC}$ requested by the access requestor from the access controller, a PCRs value $PCRs_{AR}$ requested by the access controller, a measurement log $Log_{AR}$ corresponding to the PCRs value requested by the access controller, and the signature generated by the access requestor in the TPM by using the AIK private key for the corresponding PCRs value extracted from the TPM and the random number $N_S$ generated by the TPM of the access controller to the access controller;
(3.3) after receiving the information sent from the access requestor in Step (3.2), firstly, enabling, by the access controller, the TPM to verify consistency of the random number $N_S$ generated by the TPM of the access controller and use a public key in the AIK certificate of the access requestor to verify the validity of the AIK signature of the access requestor; then, extracting, by the access controller, a corresponding PCRs value from the TPM according to the PCRs list requested by the access requestor; afterward, generating, by the access controller, a signature in the TPM by using an AIK private key for the corresponding PCRs value extracted from the TPM and the random number $N_{AR}$ generated by the TPM of the access requestor; and finally, sending, by the access controller, the random number $N_S$ generated by the TPM of the access controller, the random number $N_{AR}$ generated by the TPM of the access requestor, the AIK certificate $Cert_{AR\text{-}AIK}$ of the access requestor, the PCRs value $PCRs_{AR}$ requested by the access controller, the measurement log $Log_{AR}$ corresponding to the PCRs value requested by the access controller, the signature generated by the access requestor in the TPM by using the AIK private key for the corresponding PCRs value extracted from the TPM and the random number $N_S$ generated by the TPM of the access controller, a random number $N_{AC}$ generated by an access controller user, the AIK certificate $Cert_{AC\text{-}AIK}$ of the access controller, a PCRs value $PCRs_{AC}$ requested by the access requestor, a measurement log $Log_{AC}$ corresponding to the PCRs value requested by the access requestor, and the signature generated by the access controller in the TPM by using the AIK private key for the corresponding PCRs value extracted from the TPM and the random number $N_{AR}$ generated by the TPM of the access requestor to a policy manager;
(3.4) after receiving the information sent from the access controller in Step (3.3), firstly, using, by the policy manager, public keys corresponding to the respective AIK certificates of the access requestor and the access controller to verify the validity of the AIK signatures and the AIK certificates of the access requestor and the access controller; then, recalculating, by the policy manager, corresponding PCRs values according to the measurement logs of the corresponding PCRs values extracted from the respective TPMs of the access requestor and the access controller and according to standard integrity measurement value of various platform components in a database, and comparing the recalculated corresponding PCRs values with the corresponding PCRs values in the information sent from the access controller in Step (3.3); afterward, creating, by the policy manager, an AIK certificate authentication and platform integrity verification result $Result_{AIK\text{-}PCRs}$ of the access requestor and the access controller, and using a private key corresponding to an identity certificate of the policy manager to generate a signature $[Result_{AIK\text{-}PCRs}]_{Sig}$ for the created AIK certificate authentication and platform integrity verification result; and finally, sending, by the policy manager, the AIK certificate authentication and platform integrity verification result $Result_{AIK\text{-}PCRs}$, of the access requestor and the access controller as well as the signature $[Result_{AIK\text{-}PCRs}]_{Sig}$ generated by the policy manager for the AIK certificate authentication and platform integrity verification result to the access controller;

(3.5) after receiving the information sent from the policy manager in Step (3.4), firstly, verifying, by the access controller, whether a random number $N_{AC}$ generated by an access controller user is consistent with the random number $N_{AC}$ generated by the access controller user in the information sent from the policy manager in Step (3.4), and verifying the validity of a user signature of the policy manager; then, enabling, by the access controller, the TPM to verify consistency of the random number $N_S$ generated by the TPM of the access controller, and verify consistency between the AIK certificate $Cert_{AR\text{-}AIK}$ of the access requestor and the PCRs value $PCRs_{AR}$ requested by the access controller; afterward, verifying, by the access controller, an AIK certificate verification result $Re_{AR\text{-}AIK}$ of the access requestor and a platform integrity verification result $Re_{AR}$ of the access requestor, and creating a platform integrity evaluation result of the access requestor; and finally, sending, by the access controller, the information in Step (3.4) and the signature generated by the access controller in the TPM by using the AIK private key for the corresponding PCRs value extracted from the TPM and the random number $N_{AR}$ generated by the TPM of the access requestor to the access requestor; and (3.6) after receiving the information sent from the access controller in Step (3.5), firstly, verifying, by the access requestor, the validity of the AIK signature of the access controller and the user signature of the policy manager; then, enabling, by the access requestor, the TPM to verify consistency of the random number $N_{AR}$ generated by the TPM of the access requestor; afterward, verifying, by the access requestor, consistency between the AIK certificate of the access controller and the PCRs value requested by the access requestor; and finally, verifying, by the access requestor, an AIK certificate verification result $Re_{AC\text{-}AIK}$ of the access controller and a platform integrity verification result $Re_{AC}$ of the access controller, and creating a platform integrity evaluation result of the access requestor.

4. The TNC method according to claim 3, wherein the AIK certificate authentication and platform integrity verification result $Result_{AIK\text{-}PCRs}$ of the access requestor and the access controller created in Step (3.4) comprises: the random number $N_{AC}$ generated by the access controller user, the random number $N_S$ generated by the TPM of the access controller, the AIK certificate $Cert_{AR\text{-}AIK}$ of the access requestor, the PCRs value $PCRs_{AR}$ requested by the access controller, the platform integrity verification result $Re_{AR}$ of the access requestor, the random number $N_{AR}$ generated by the TPM of the access requestor, the AIK certificate $Cert_{AC\text{-}AIK}$ of the access controller, the PCRs value $PCRs_{AC}$ requested by the access requestor, the platform integrity verification result $Re_{AC}$ of the access controller, the AIK certificate verification result $Re_{AR\text{-}AIK}$ of the access requestor, and the AIK certificate verification result $Re_{AC\text{-}AIK}$ of the access controller.

5. The TNC method according to claim 1, wherein the recommendations sent from the TNC server and the TNC client to the network access controller and the network access requestor in Step (4.) are access grant information, access denial information, or isolation remediation information.

6. The TNC method according to claim 2, wherein the recommendations sent from the TNC server and the TNC client to the network access controller and the network access requestor in Step (4.) are access grant information, access denial information, or isolation remediation information.

7. The TNC method according to claim 3, wherein the recommendations sent from the TNC server and the TNC client to the network access controller and the network access requestor in Step (4.) are access grant information, access denial information, or isolation remediation information.

8. The TNC method according to claim 4, wherein the recommendations sent from the TNC server and the TNC client to the network access controller and the network access requestor in Step (4.) are access grant information, access denial information, or isolation remediation information.

9. The TNC method according to claim 3, wherein in the process of creating the platform integrity evaluation result of the access requestor in Step (3.5), when the access controller needs to exchange integrity information with the access requestor and verify the integrity information again, Step (3.1) to Step (3.6) are repeated.

10. The TNC method according to claim 3, wherein in the process of creating the platform integrity evaluation result of the access requestor in Step (3.5), when the access controller needs to exchange integrity information with the access requestor and verify the integrity information again, Step (3.1) to Step (3.6) are repeated.

11. The TNC method according to claim 7, wherein in the process of creating the platform integrity evaluation result of the access requestor in Step (3.5), when the access controller needs to exchange integrity information with the access requestor and verify the integrity information again, Step (3.1) to Step (3.6) are repeated.

12. The TNC method according to claim 8, wherein in the process of creating the platform integrity evaluation result of the access requestor in Step (3.5), when the access controller needs to exchange integrity information with the access requestor and verify the integrity information again, Step (3.1) to Step (3.6) are repeated.

13. The TNC method according to claim 3, wherein in the process of creating the platform integrity evaluation result of the access requestor in Step (3.6), when the access requestor needs to exchange integrity information with the access controller and verify the integrity information again, Step (3.2) to Step (3.6) are repeated.

14. The TNC method according to claim 3, wherein in the process of creating the platform integrity evaluation result of the access requestor in Step (3.6), when the access requestor needs to exchange integrity information with the access controller and verify the integrity information again, Step (3.2) to Step (3.6) are repeated.

15. The TNC method according to claim 11, wherein in the process of creating the platform integrity evaluation result of the access requestor in Step (3.6), when the access requestor needs to exchange integrity information with the access controller and verify the integrity information again, Step (3.2) to Step (3.6) are repeated.

16. The TNC method according to claim 12, wherein in the process of creating the platform integrity evaluation result of the access requestor in Step (3.6), when the access requestor needs to exchange integrity information with the access controller and verify the integrity information again, Step (3.2) to Step (3.6) are repeated.

* * * * *